Figure 1:
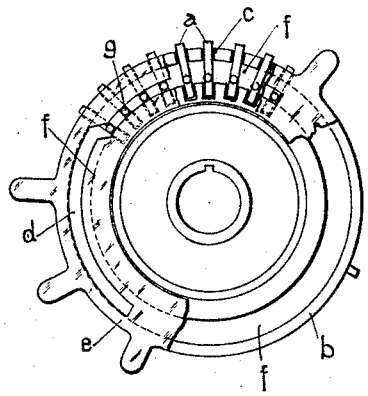

Aug. 18, 1925.

H. HOFFMEISTER

CALCULATING MACHINE

Filed Feb. 3, 1925

1,550,610

Inventor
Hermann Hoffmeister

Patented Aug. 18, 1925.

1,550,610

UNITED STATES PATENT OFFICE.

HERMANN HOFFMEISTER, OF GLIESMARODE, NEAR BRUNSWICK, GERMANY, ASSIGNOR TO GRIMME, NATALIS & CO., AKTIENGESELLSCHAFT, OF BRUNSWICK, GERMANY, A CORPORATION OF GERMANY.

CALCULATING MACHINE.

Application filed February 3, 1925. Serial No. 6,607.

*To all whom it may concern:*

Be it known that I, HERMANN HOFFMEISTER, a citizen of Germany, residing at Gliesmarode, near Brunswick, Germany, have invented certain new and useful Improvements in Calculating Machines (for which I have filed application in Germany, February 4, 1924), of which the following is a specification.

My invention relates to improvements in calculating machines, and more particularly in calculating machines of the type shown and described in the patent of the United States, No. 1,040,059, granted October 1, 1912 to Trinks, and comprising a setting mechanism composed of setting disks carrying radially shiftable teeth, cam disks one for each of said setting disks and engaging the said teeth for shifting the desired number thereof in radial direction, and registering mechanism adapted to be operated by the teeth of the setting mechanism shifted by the cam disks into operative positions. In machines of this type the shiftable teeth of the setting mechanism are provided with laterally projecting pins engaging in cam slots formed in the cam disks, and it has been proposed to fit the said pins in bores of the teeth and fix the same in position by upsetting the rear ends thereof. The object of the improvements is to construct the setting mechanism so that a nice finish of the upset ends of the pin and the side faces of the teeth may be dispensed with, and with this object in view I provide the setting disks carrying the teeth at a part opposite to the teeth with a concentric groove, the radial dimension of the said groove being such that the upset parts of the teeth may freely move through the same when shifting the teeth in radial direction. Preferably the breadth of the groove exceeds the space required for the upset end of the teeth, so that also the side walls of the teeth which are slightly widened by upsetting the rivets may freely pass through the said groove.

For the purpose of explaining the invention an example embodying the same has been shown in the accompanying drawing, in which the same reference characters have been used in all the views to indicate corresponding parts. In said drawing—

Figure 2:
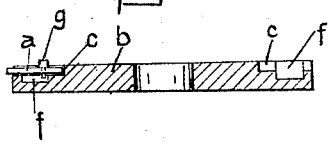

Fig. 1 is an elevation showing a setting disk and a part of a cam disk placed in front thereof, and Fig. 2 is a partial sectional view of the setting disk and one of the teeth mounted therein.

The general construction of the calculating machine to which my invention relates is known in the art and it has been described for example in the aforesaid patent to Trinks, and I deem it not necessary to describe the machine in detail.

The setting mechanism comprises setting disks $b$ formed with radial slots $c$ providing seats for radially shiftable teeth $a$ carrying laterally projecting pins $g$, and a cam disk $e$ formed with a slot $d$ engaging the laterally projecting pins $g$ of the setting disk. When turning the cam disk $e$ through a suitable angle the desired number of teeth $a$ is shifted outwardly and into operative position for transmitting values to the registering mechanism when rotating the machine crank, as is known in the art. As appears more particularly from Fig. 2 the pins $g$ are fitted in bores of the teeth $a$, and the rear ends of the said pins are upset for fixing the same in position. When thus upsetting the pins the teeth are slightly widened, and it is necessary, to finish the side walls of the pins after riveting and to remove the projecting parts of the upset ends of the pins $g$ in order to provide for a free movement of the teeth within the slots $c$. In my improved construction this work may be dispensed with by providing a concentric groove $f$ the radial dimension of which corresponds to the radial movement of the teeth $a$, so that the widened portions of the teeth and the upset ends of the pins $g$ have free movement through the said groove. For convenience in the manufacture the groove $f$ extends all around the setting disk though practically only a part of the said length is made use of. But I wish it to be understood that I do not limit myself to this feature.

While in describing the invention reference has been made to a particular example embodying the same I wish it to be understood that my invention is not limited to the construction shown in the drawing, and that various changes may be made in the general arrangement of the apparatus and the construction of its parts without departing from the invention.

I claim:

A setting mechanism for calculating machines comprising a setting disk, teeth radially shiftable in said setting disk and having laterally projecting pins fitted therein, and a cam disk provided with a cam slot engaging said pins and adapted to shift the teeth, said setting disk being formed at the part opposite to said pins with a concentric groove corresponding to the stroke of said pins.

In testimony whereof I have affixed my signature.

Dr. Ing. HERMANN HOFFMEISTER.